US012594838B2

(12) United States Patent
Inose et al.

(10) Patent No.: US 12,594,838 B2
(45) Date of Patent: Apr. 7, 2026

(54) METHOD OF MODULATION OF TORQUE BY VEHICLE PROPULSION MOTOR

(71) Applicant: GKN Automotive Limited, Birmingham (GB)

(72) Inventors: Hideyuki Inose, Tochigi City (JP); Yuu Yaguchi, Tochigi City (JP)

(73) Assignee: GKN Automotive Limited, Birmingham (GB)

( * ) Notice: Subject to any disclaimer, the term of this patent is extended or adjusted under 35 U.S.C. 154(b) by 159 days.

(21) Appl. No.: 18/531,930

(22) Filed: Dec. 7, 2023

(65) Prior Publication Data

US 2025/0121698 A1     Apr. 17, 2025

(30) Foreign Application Priority Data

Oct. 11, 2023   (JP) ................................. 2023-175854

(51) Int. Cl.
| | |
|---|---|
| *H02P 6/10* | (2006.01) |
| *B60L 15/02* | (2006.01) |
| *B60L 15/08* | (2006.01) |
| *H02P 21/20* | (2016.01) |
| *H02P 21/22* | (2016.01) |
| *H02P 27/08* | (2006.01) |

(52) U.S. Cl.
CPC ............. *B60L 15/025* (2013.01); *B60L 15/08* (2013.01); *H02P 21/20* (2016.02); *H02P 21/22* (2016.02); *H02P 27/08* (2013.01); *B60L 2240/423* (2013.01)

(58) Field of Classification Search
CPC ......... H02P 21/22; H02P 21/20; H02P 27/08; H02P 6/10; B60L 15/08; B60L 15/025; B60L 2240/423

USPC ......................................................... 318/432
See application file for complete search history.

(56) References Cited

U.S. PATENT DOCUMENTS

| | | | | |
|---|---|---|---|---|
| 10,036,359 B2 * | 7/2018 | Hao | .......................... | B60K 6/48 |
| 10,090,788 B2 * | 10/2018 | Lorilla | .................... | H02P 27/08 |
| 2009/0028532 A1 * | 1/2009 | El-Antably | ............... | H02P 6/10 |
| | | | | 388/819 |
| 2010/0134058 A1 * | 6/2010 | Nagashima | ............. | H02P 21/06 |
| | | | | 180/65.285 |

(Continued)

FOREIGN PATENT DOCUMENTS

| | | |
|---|---|---|
| DE | 102009046166 A1 | 7/2010 |
| JP | 2013150498 A | 8/2013 |
| JP | 2022048802 A | 3/2022 |

OTHER PUBLICATIONS

DE Office Action for DE Application No. 102023135765.4 dated Sep. 17, 2024 (14 pages).

*Primary Examiner* — Gabriel Agared
(74) *Attorney, Agent, or Firm* — Reising Ethington P.C.

(57)     ABSTRACT

A method for modulating torque of a vehicle propulsion motor driven by first, second and third cyclic currents mutually shifted by electrical angles of 120 degrees and applied in accordance with a rotating magnetic field by a rotor is provided with: applying pulse-width modulated voltage pulses respectively to switching devices to generate the first, second and third cyclic currents; and adding a phase shift to the first, second and third cyclic currents relative to the rotating magnetic field, or causing an amplitude modulation in the first, second and third cyclic currents.

1 Claim, 7 Drawing Sheets

(56) References Cited

U.S. PATENT DOCUMENTS

2016/0111991 A1 * 4/2016 Hozuki ............... H02P 21/0003
                                                       318/400.02
2017/0257043 A1 * 9/2017 Lorilla .................... H02P 21/05

* cited by examiner $T_E$

ROTATIONAL ANGLE OF CRANK (DEGREE)

$T_M$

ELECTRICAL ANGLE /
ROTATIONAL ANGLE OF ROTOR (DEGREE)

ELECTRICAL ANGLE /
ROTATIONAL ANGLE OF ROTOR (DEGREE)

ELECTRICAL ANGLE /
ROTATIONAL ANGLE OF ROTOR (DEGREE)

FIG. 5

METHOD OF MODULATION OF TORQUE BY VEHICLE PROPULSION MOTOR

CROSS-REFERENCE TO RELATED APPLICATIONS

This application is based upon and claims the benefit of priority from Japanese Patent Application No. 2023-175854 (filed Oct. 11, 2023), the entire contents of which are incorporated herein by reference.

BACKGROUND

Internal-combustion engines have been dominant as power sources for vehicles in the field of transport machinery in the past, vehicles with however, electric motors as power sources for vehicles are increasingly common. Electric motors are effective in suppressing carbon dioxide emission and contributive to vehicle performance, such as providing enhanced acceleration from low-speed areas.

In general, a motor for propelling a vehicle utilizes a permanent magnet synchronous motor with a rotor that has permanent magnets and a stator that has coils. The motor may be free of commutators and generate currents that are synchronous to a rotating magnetic field provided by the rotor. The currents may be applied to the coils and may cause the motor to generate torque. Optimization of the current may suppress a torque ripple and therefore enable smoother operation of the vehicle.

SUMMARY

In the conventional vehicle propulsion motors, with current control using invertor circuits for example, smooth torque output without a ripple has been pursued. These motors may give drivers a smoother ride than internal-combustion engines. The present inventors, however, found that elimination of a torque ripple is not always desirable and a fluctuation in torque output may be beneficial in some aspects, such as recovery of traction on a rough road such as deep sand for example.

The disclosure herein relates to a method of modulation of torque output by a vehicle propulsion motor and, in particular, to a method of modulation of torque output by a vehicle propulsion motor powered by cyclic currents having evenly spaced phase differences. More specifically, the following disclosure relates to a method for realizing a torque fluctuation similar to a torque ripple generated by an internal-combustion engine.

A method for modulating torque of a vehicle propulsion motor driven by first, second and third cyclic currents mutually shifted by electrical angles of 120 degrees and applied in accordance with a rotating magnetic field of a rotor is provided with: applying pulse-width modulated voltage pulses respectively to switching devices to generate the first, second and third cyclic currents; and adding a phase shift to the first, second and third cyclic currents relative to the rotating magnetic field, or causing an amplitude modulation in the first, second and third cyclic currents.

BRIEF DESCRIPTION OF THE DRAWINGS

FIG. 5 is a circuit diagram showing an example of a circuit for generating alternating currents.

DESCRIPTION

Exemplary embodiments will be described hereinafter with reference to the appended drawings.

Figure 1:
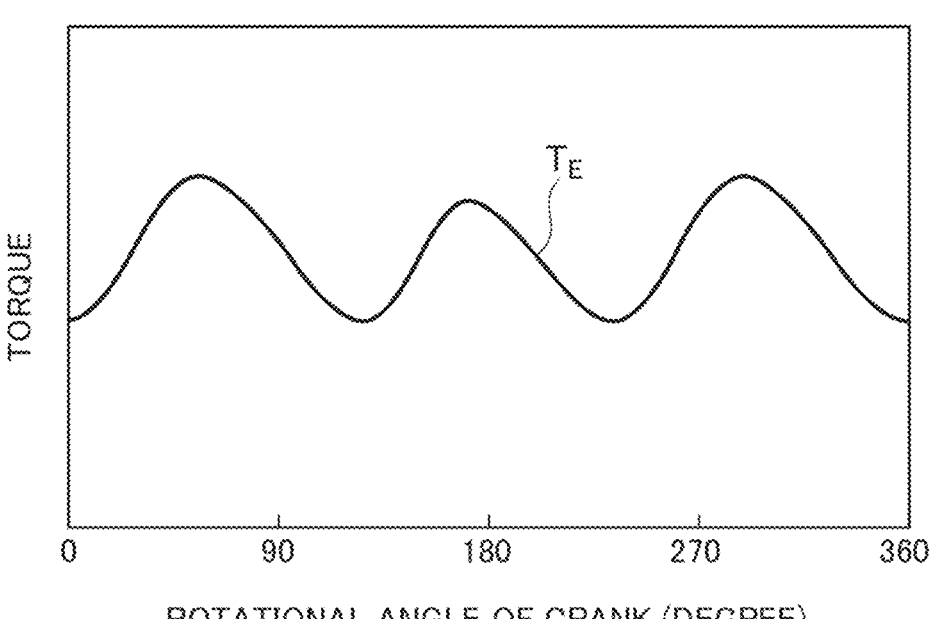
FIG. 1 is a graph showing an example of a torque fluctuation in driving force by a conventional internal-combustion engine.

In a four-cycle gasoline engine for example, a cylinder completes four cycles of suction, compression, combustion and exhaustion while a crankshaft turns twice. Among these cycles, only the combustion cycle generates torque and the other cycles act as resistance. While two or more cylinders are generally combined in such a way as to differentiate these crank angles and thereby avoid overlapping these combustion cycles, resultant composite torque TE exhibits a cyclic fluctuation as shown as an example in FIG. 1.

Figure 2:
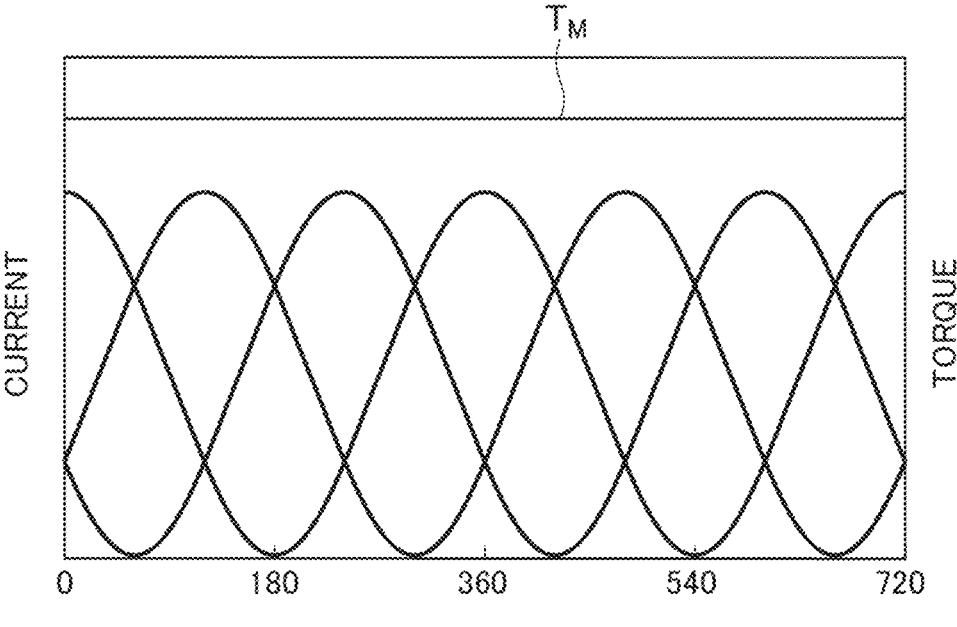
FIG. 2 is a graph showing an example of a three-phase alternating current applied to a vehicle propulsion motor and output torque.

In a conventional vehicle propulsion motor, cyclic currents mutually phase shifted by electrical angles of 120 degrees for example are sequentially applied to three sets of coils so as to generate a rotating magnetic field synchronous to rotation of a rotor. When sine-wave alternating currents are used as the cyclic currents and properly phase shifted, the motor may generate substantially ripple-free torque IM as shown in FIG. 2. In the conventional vehicle propulsion motors, ripple-free torque generation has been pursued in light of noise and vibration reduction.

The embodiments described below provide vehicle propulsion motors with modulated torque having a torque ripple similar to than of an internal-combustion engine.

In a three-phase sine-wave operation, when an applied current is synchronous to rotation of the rotor, generated torque obeys an equation of:

$$T = Kt\sin\varphi \cdot I_0\sin\varphi +$$
$$Kt\sin\left(\varphi + \frac{2\pi}{3}\right) \cdot I_0\sin\left(\varphi + \frac{4\pi}{3}\right) + Kt\sin\left(\varphi - \frac{2\pi}{3}\right) \cdot I_0\sin\left(\varphi - \frac{4\pi}{3}\right),$$

where Kt represents a torque coefficient, $I_0$ represents an applied total current, and $\varphi$ represents an electrical angle.

While the three terms on the right side respectively create cyclically fluctuating torque, the sum of these terms makes the fluctuations cancel out to provide substantially ripple-free torque as shown as an example in FIG. 2. When a small phase shift or lag θ relative to the rotating magnetic field were is added to the applied current, generated torque obeys an equation of:

$$T = Kt\sin\varphi \cdot I_0\sin(\varphi + \theta) +$$

$$Kt\sin\left(\varphi + \frac{2\pi}{3}\right) \cdot I_0\sin\left(\varphi + \frac{4\pi}{3} + \theta\right) + Kt\sin\left(\varphi - \frac{2\pi}{3}\right) \cdot I_0\sin\left(\varphi - \frac{4\pi}{3} + \theta\right)$$

Figure 3:
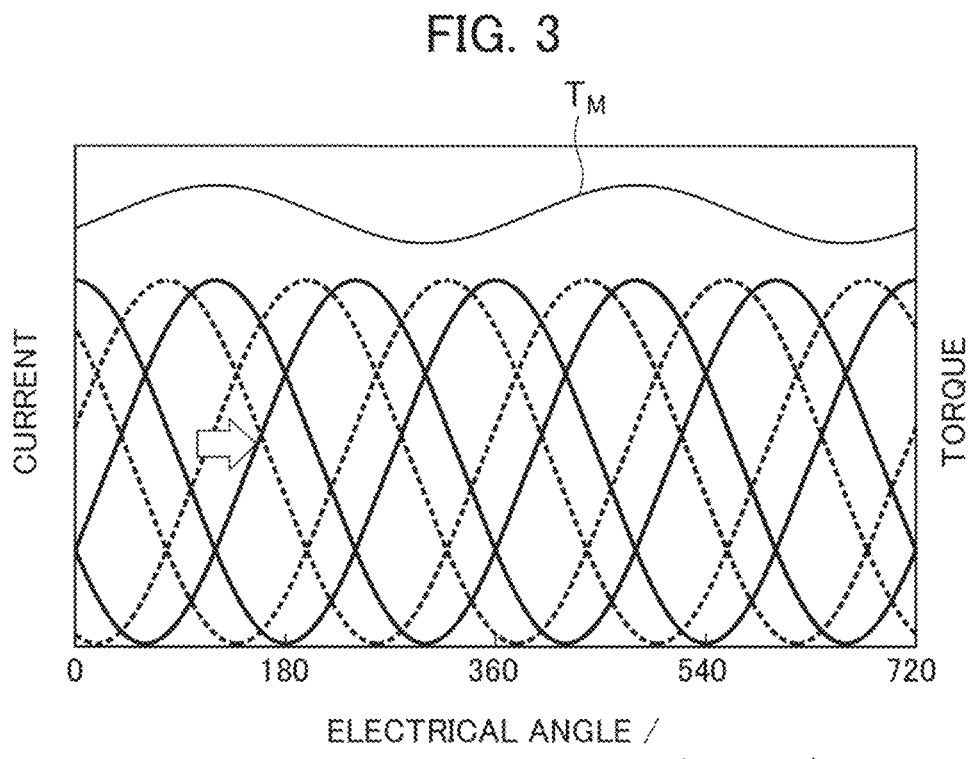
FIG. 3 is a graph showing an example of torque modulated by adding a phase shift to the applied current.

With the small phase shift, the fluctuations do not cancel out even in the summation, thereby creating a generated torque $T_M$ with a cyclic modulation as shown as an example in FIG. 3.

Figure 4:
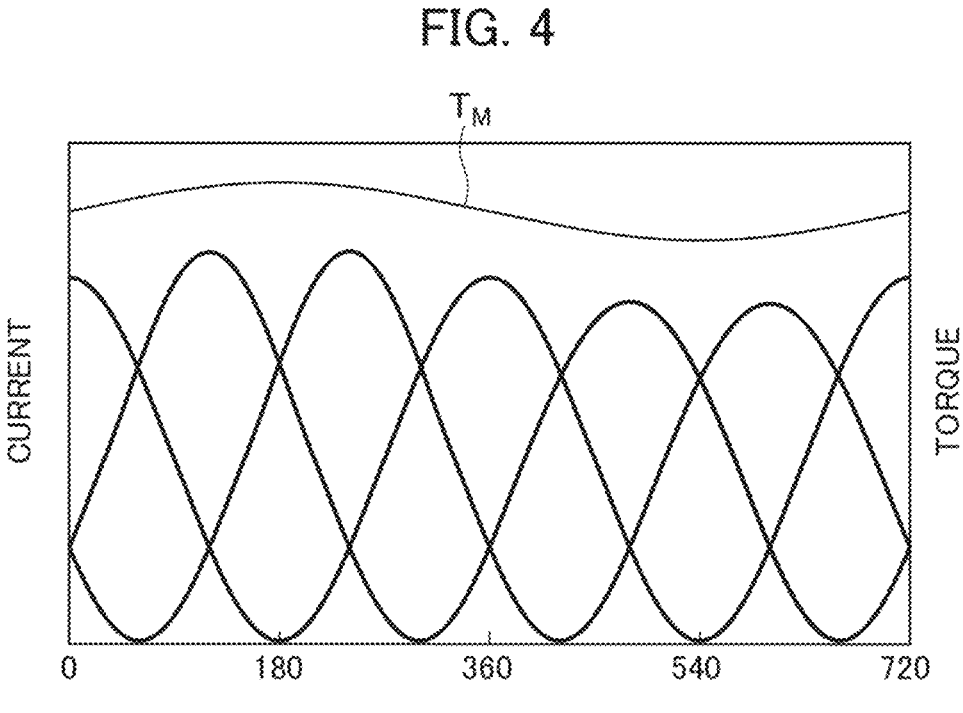
FIG. 4 is a graph showing an example of torque modulated by adding a modulation to the applied current.

Alternatively, similar modulation in the generated torque $T_M$ may be realized by adding an amplitude modulation to the applied current $I_0$. FIG. 4 illustrates such an example. While the modulated torque described above typically exhibits a sine-wave-like curve as illustrated in FIG. 3, based on the amplitude modulation to the current $I_0$, arbitrary waveforms provide the modulation.

Yet further alternatively, frequency modulation could also cause modulation in the generated torque. However, frequency modulation may cause the resultant torque to step out of phase. Therefore the frequency modulation may be applicable only to short-term modulation for example.

Figure 5:
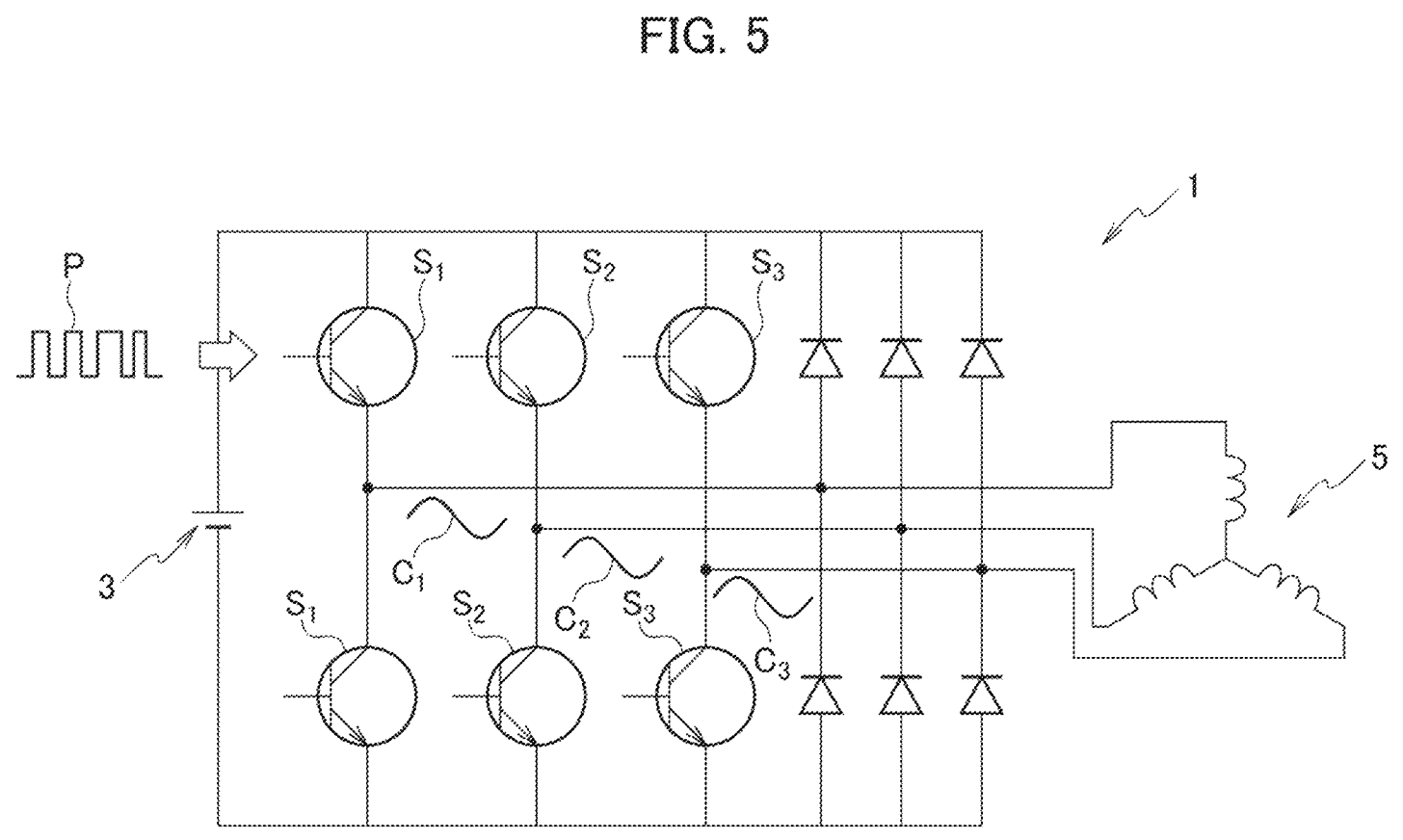

Referring to FIG. 5, means for modulating torque generated by a vehicle propulsion motor will be described below. A circuit 1 is provided with a power source 3 and three sets of switching devices $S_1$, $S_2$, $S_3$, outputs of which are respectively connected to inputs of coils 5. Insulated-gate bipolar transistors may for example be optionally applied to switching devices $S_1$, $S_2$, $S_3$.

Figure 6:
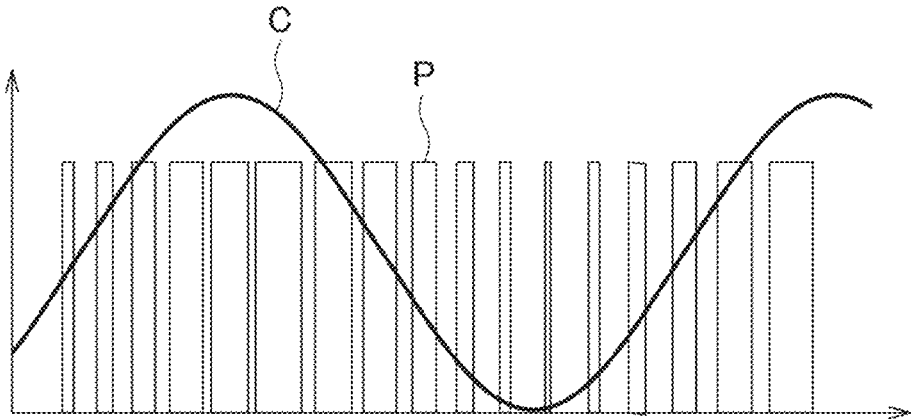
FIG. 6 is a graph schematically showing an example of pulse-width modulated voltage pulses and an alternating current generated thereby.
Figure 7:
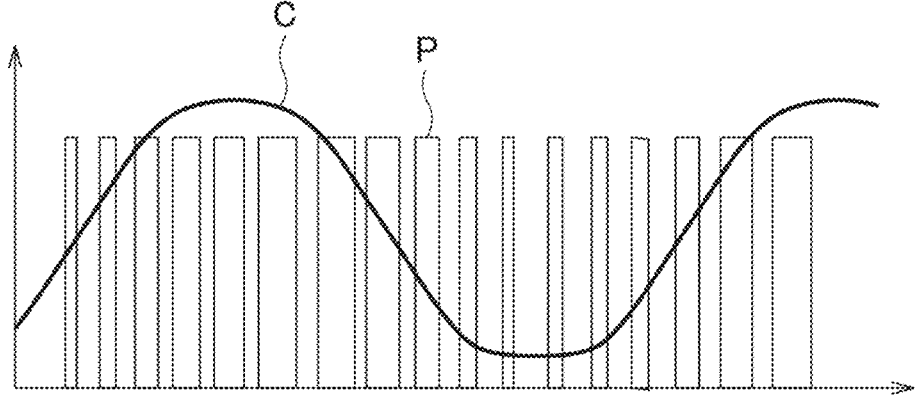
FIG. 7 is a graph schematically showing another example of pulse-width modulated voltage pulses and an alternating current generated thereby.

When width-modulated voltage pulses P are input to the gates of the switching devices $S_1$, $S_2$, $S_3$, respective output terminals output cyclic currents $C_1$, $C_2$, $C_3$. FIG. 6 shows an example of a relation between the voltage pulses P and the output waves C, in which sine-waves are output. By changing the pulse-width modulation, arbitrary waveforms may be obtained. In an example shown in FIG. 7, distorted sine-waves are output. As will be readily understood, if the input voltage pulses P are delayed, the resultant output waves C also exhibit corresponding delay and, more specifically, a phase shift can be added to the cyclic currents relative to the rotating magnetic field. Further, by modulating the input voltage pulses P, the amplitudes of the output waves C can be modulated.

Figure 8:
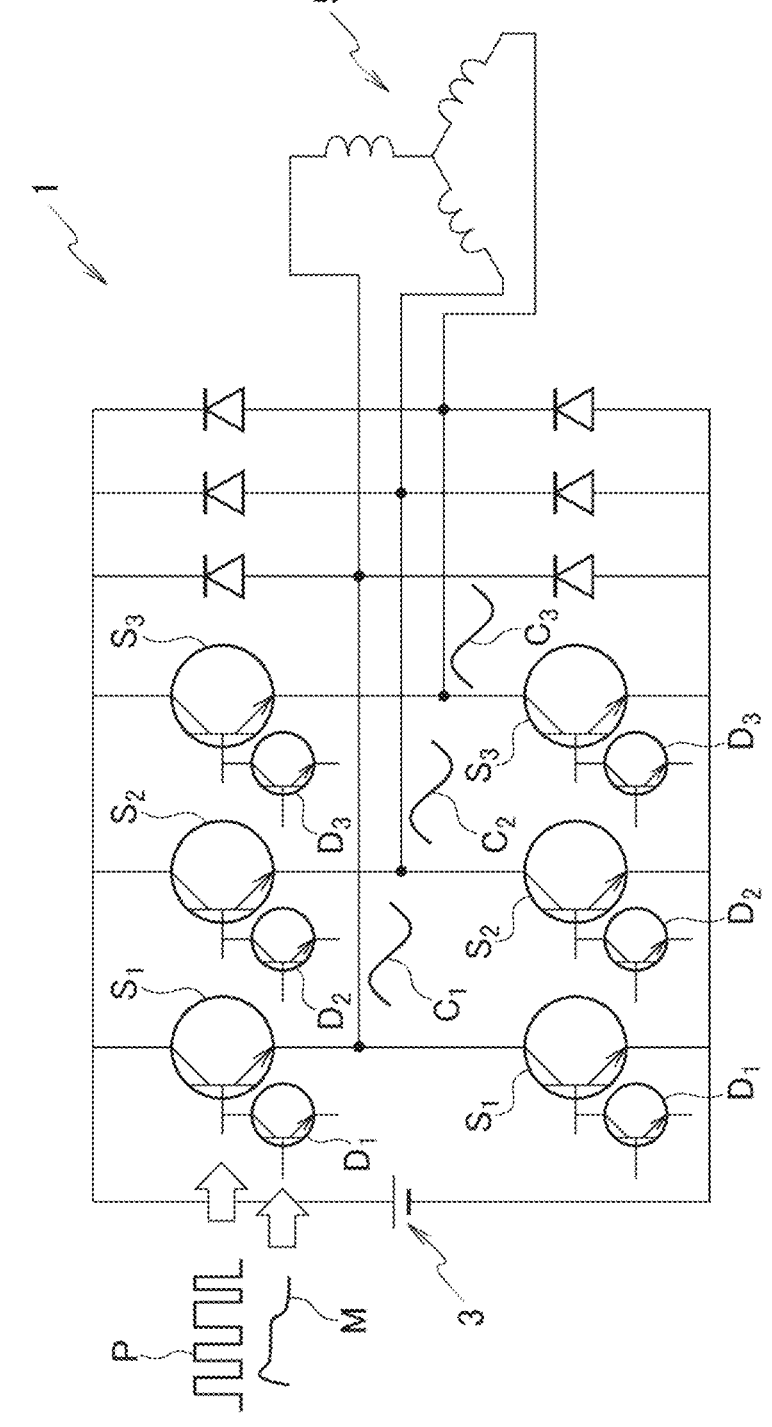
FIG. 8 is a circuit diagram showing another example of a circuit for generating alternating currents.

To modulation of the voltage pulses P, a circuit shown in FIG. 8, for example, may be used. Specifically, external circuits for modulation may be connected to the respective gates of the switching devices $S_1$, $S_2$, $S_3$, and waves for the modulation may be input to the respective circuits, thereby modulating the input voltage pulses P. In this example, the voltage pulses P are common to those of the prior art and the modulation is created by applying a modulation wave M to the added circuits. To the added circuits, grounded emitter circuits $D_1$, $D_2$, $D_3$ illustrated in the drawing may be applicable, but this example is not exhaustive.

Figure 9:
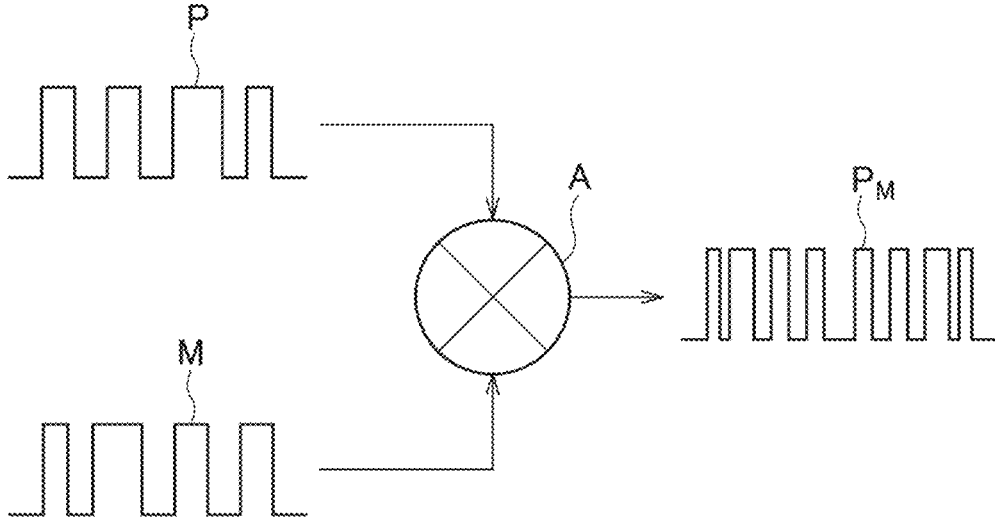
FIG. 9 shows a schematic of modulating voltage pulses.

Alternatively, the voltage pulses P may be modulated in advance. FIG. 9 shows such an example, in which a logical operation device A outputs modulated voltage pulses $P_M$. By inputting the voltage pulses $P_M$ into a circuit such as that shown in FIG. 6 for example, the widths of the output waves C can be modulated.

Figure 10:
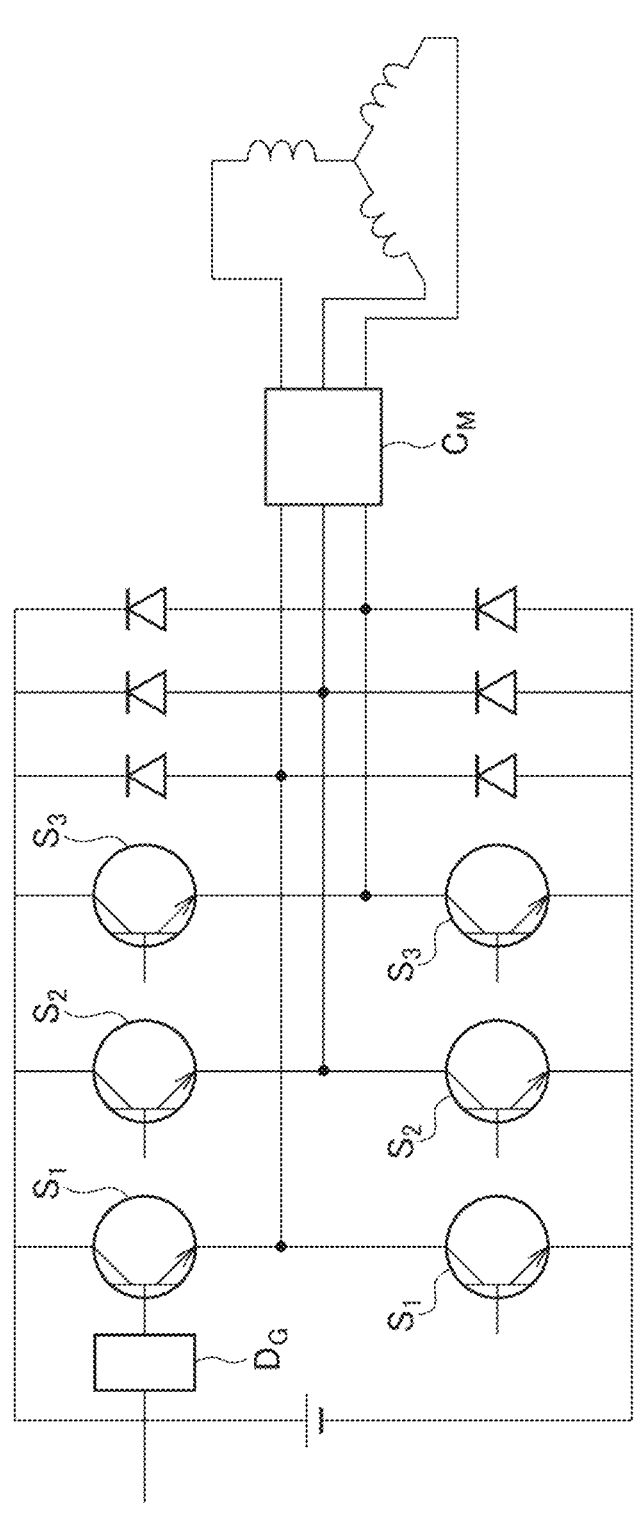
FIG. 10 is a circuit diagram schematically showing still another example of pulse-width modulated voltage pulses and an alternating current generated thereby.

Still alternatively, as shown as an example in FIG. 10, circuits $C_M$ may be added to the output stages of the switching devices $S_1$, $S_2$, $S_3$ so that the widths of the output waves C are modulated by operation of the circuits $C_M$.

According to the present embodiments, torque generated by a vehicle propulsion motor can be modulated with a simple construction. The modulated torque is beneficial in recovery of traction in certain road conditions. The modulated torque is sufficiently similar to fluctuating torque produced by an internal-combustion engine and does not bring discomfort to a driver seasoned to conventional vehicles. Whether the generated torque is kept constant or modulated can be readily selected by on-off control of the added circuits. For example, the driver of the vehicle can, by operation of a switch at hand, or under automatic control by the vehicle, select to use modulated/unmodulated torque depending on the road condition.

Although certain exemplary embodiments are described above, modifications and variations of the embodiments will occur to those skilled in the art, in light of the above teachings.

What is claimed is:

1. A method for modulating torque of a vehicle propulsion motor driven by first, second and third cyclic currents mutually shifted by electrical angles of 120 degrees and applied in accordance with a rotating magnetic field by a rotor, the method comprising:

applying pulse-width modulated voltage pulses respectively to switching devices to generate the first, second and third cyclic currents; and adding a phase shift to the first, second and third cyclic currents relative to the rotating magnetic field, wherein the phase shift is generated by adding a lag to the voltage pulses relative to the rotating magnetic field, or causing an amplitude modulation in the first, second and third cyclic currents, wherein the amplitude modulation is generated by adding a cyclic modulation to the pulse width of the voltage pulses, or by adding a modulation to a gain of the generated first, second and third cyclic currents.

* * * * *